United States Patent Office 2,781,928
Patented Feb. 19, 1957

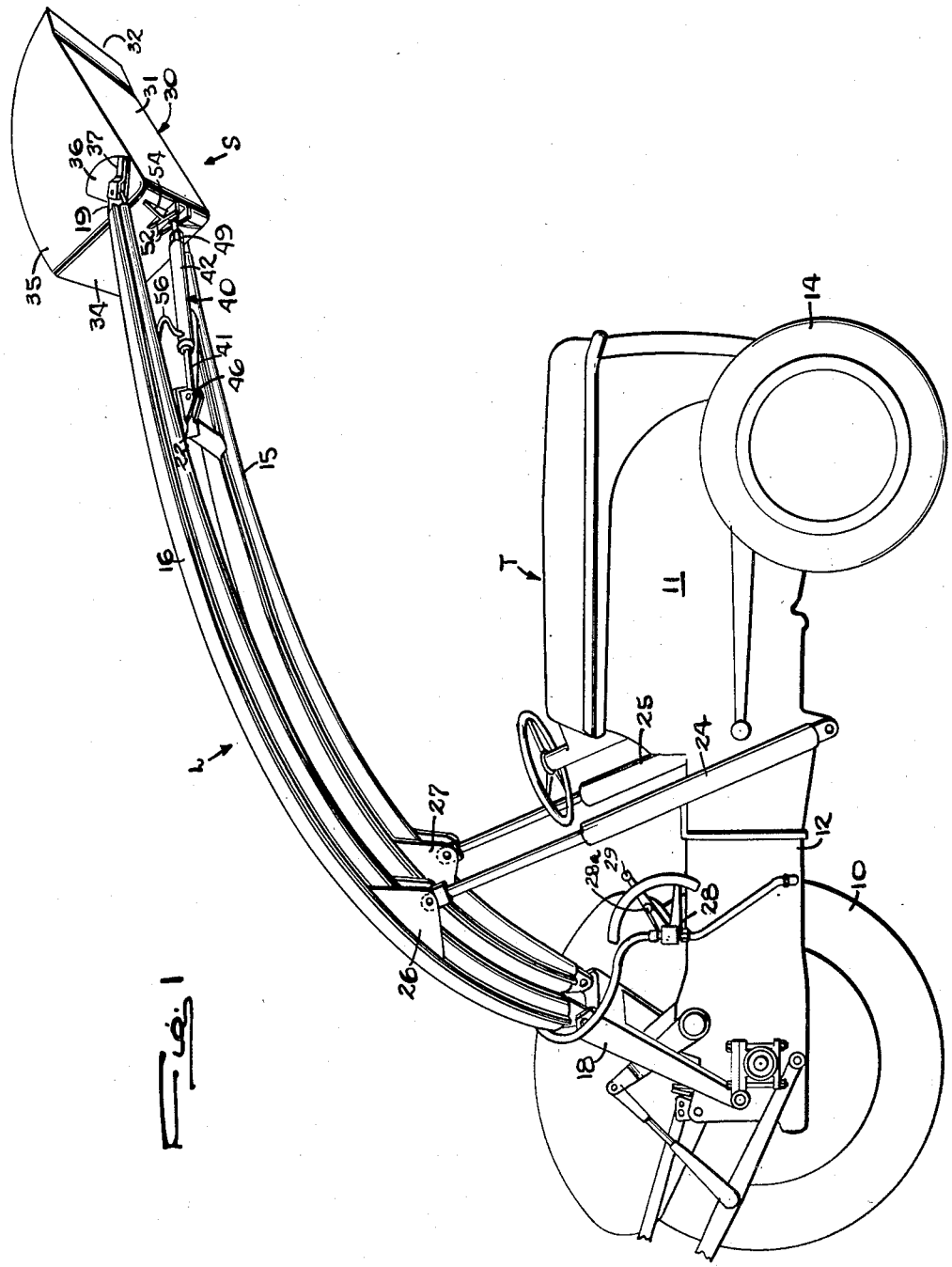

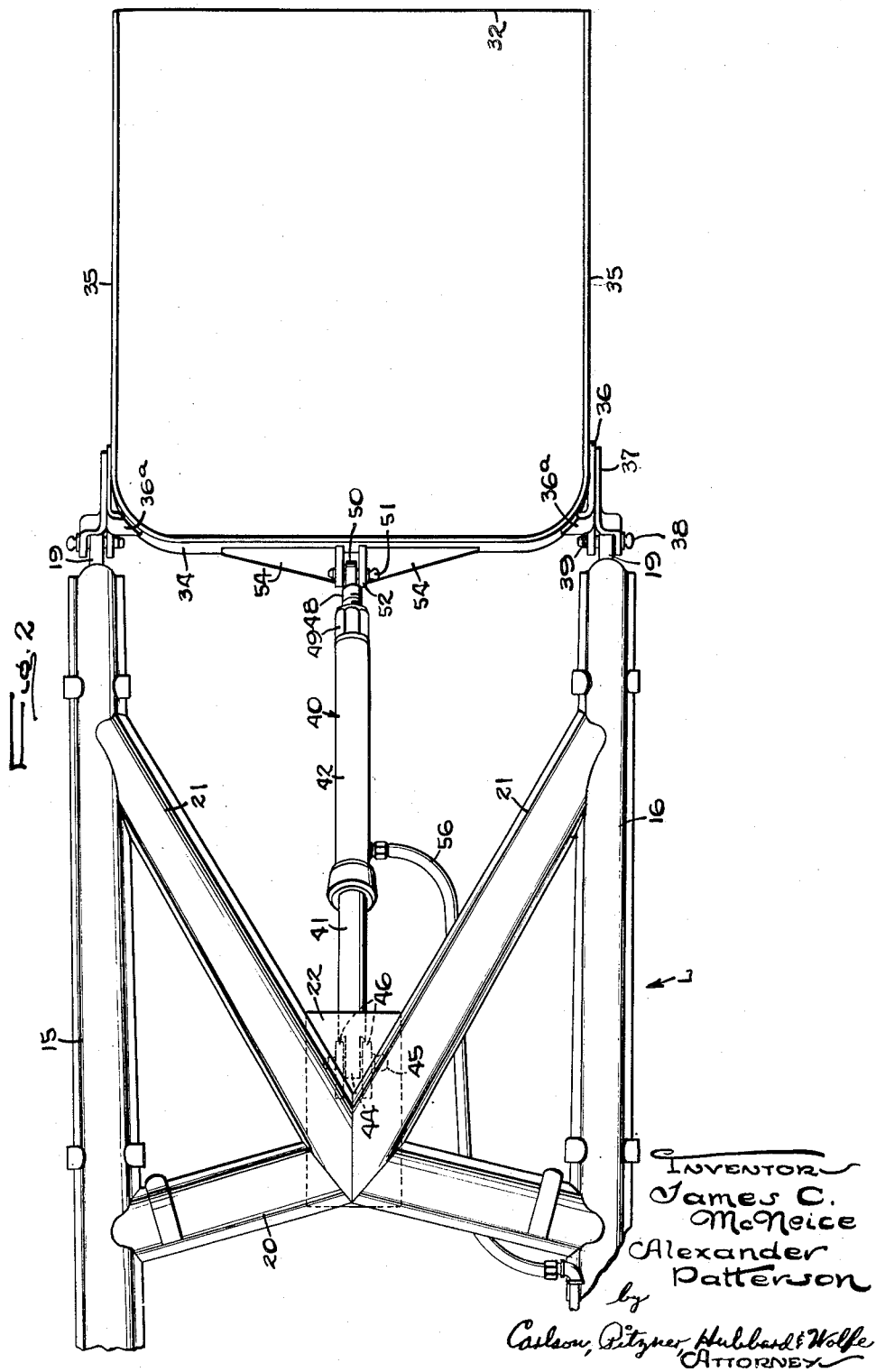

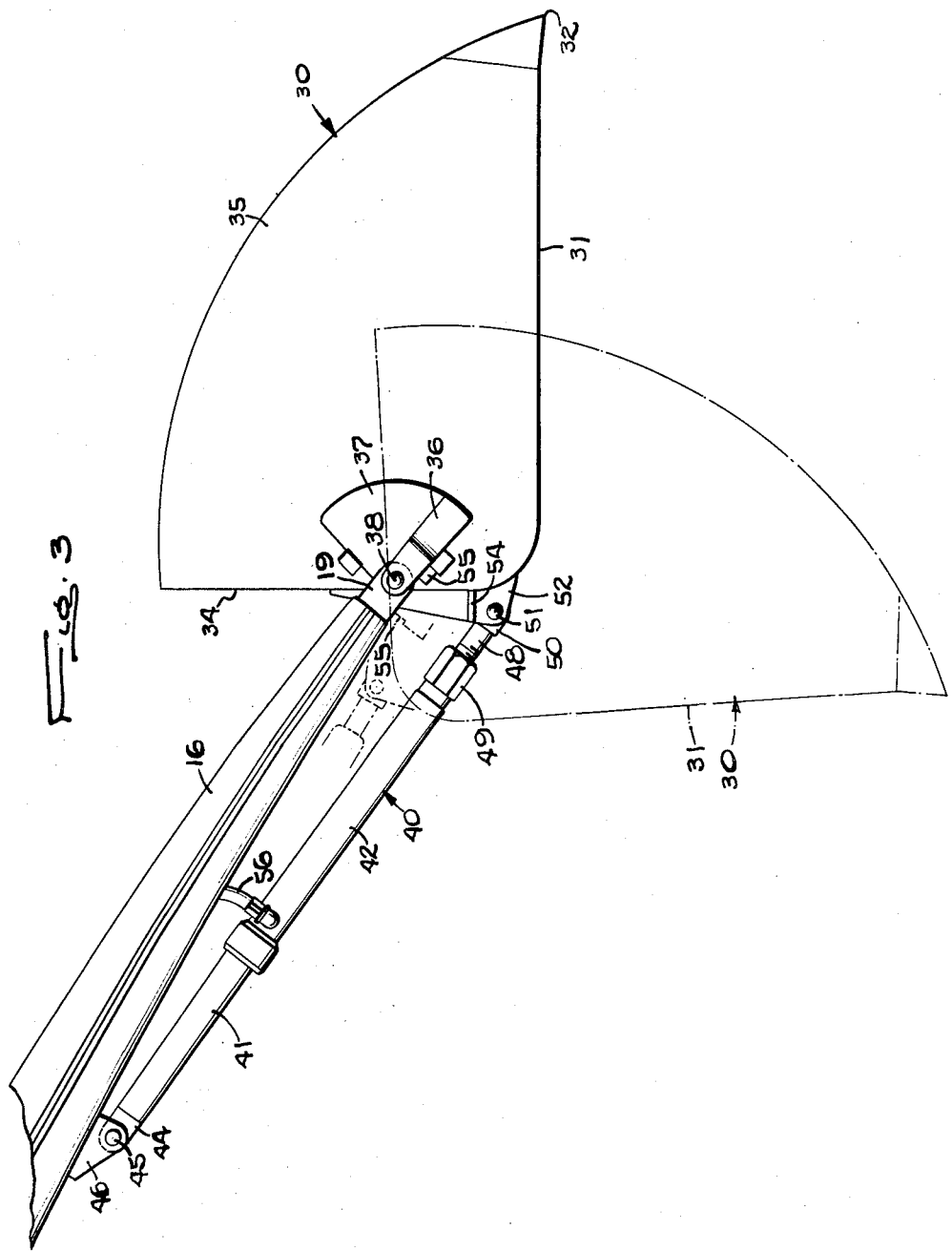

2,781,928
TIP SCOOP

James Curtis McNeice, Lillington, Leamington Spa, and Alexander Patterson, Leamington Spa, England, assignors to Massey-Harris-Ferguson (Sales) Limited, a British company Application October 5, 1953, Serial No. 384,193

Claims priority, application Great Britain October 9, 1952

3 Claims. (Cl. 214—140)

The present invention relates to front end loaders for use on tractors or the like and, more particularly, to tip scoops of the type adapted to be carried by a lifting structure on a tractor and movable between a substantially horizontal loading and carrying position and a substantially vertical unloading position.

The general aim of the invention is to provide a simplified and rugged tip scoop operable between loading and unloading positions, and in which a single actuator for moving the scoop between such positions is operative to maintain it in loading position without resort to latch and latch-releasing mechanisms.

Another object of the invention is to provide such a tip scoop which is adjustable in loading position or angle of attack on material to be picked up.

Other objects and advantages will become apparent as the following description proceeds, taken in conjunction with the accompanying drawings, in which:

Figure 1 is a perspective view of a tip scoop embodying the present invention and illustrated as applied on an exemplary lifting attachment carried by a tractor; and Figs. 2 and 3 are plan and side elevation views, respectively, of the tip scoop together with a part of the lifting attachment.

While the invention has been illustrated and is described in some detail with reference to a particular embodiment thereof, there is no intention that it thus be limited to such detail. On the contrary, it is intended here to cover all modifications, alternative constructions, and equivalents falling within the spirit and scope of the invention as defined by the appended claims.

Referring now to the exemplary form of the invention here shown, a tip scoop S has been illustrated as applied, in one advantageous use, on a lifting attachment L connected with a tractor T (Fig. 1). In order to make clear the illustrated environment of the invention, the tractor and lifting attachment will be briefly described.

While the tractor T may be any one of a wide variety, that here illustrated will be recognized by those skilled in the art as the familiar "Ferguson" tractor, which is preferably equipped with an implement hitch and hydraulic system of the type more fully described in Ferguson Patent 2,118,180. For powering rear traction wheels 10, the tractor includes a forward engine section 11, working through a transmission 12. Maneuverability is afforded by steerable front wheels 14. A source of pressure fluid is provided by a pump (not shown) driven from the engine through a suitable power take-off in accordance with the above mentioned Ferguson patent.

The lifting attachment L may also take different forms. For example, that here shown is of the type described and claimed in the copending U. S. application of Chambers et al., Serial No. 214,254, filed March 7, 1951 (now Patent No. 2,701,072, issued February 1, 1955), and assigned to the assignees of the present invention. Briefly, the lifting attaching includes a pair of downwardly curved, forwardly extending tubular booms 15, 16, disposed on opposite sides of the tractor, and pivoted at their aft ends to an elevated fulcrum bridge 18 attached to the rear end of the tractor. The forward ends of the booms 15, 16 extend beyond the tractor and for connection with material handling devices carry apertured lugs 19 (Figs. 2 and 3). Preferably, the booms are interbraced at their forward ends by a welded cross brace 20 and a pair of diagonal straps 21 converging rearwardly from either boom for connection with the cross brace by means of top and bottom welded plates 22. For rocking the booms 15, 16 about the pivot connections at their aft ends, a pair of hydraulic lifting rams 24, 25 are pivotally connected at their lower ends to a transverse cross member secured on the underside of the tractor, and at their upper ends to plates 26, 27 fastened beneath the mid portions of the respective booms. The lifting rams 24, 25 are connected into the hydraulic system of the tractor through a suitable control valve 28 having a hand lever 28a located adjacent to the driver's seat and adapted to selectively supply or bleed pressured fluid to or from the rams to raise and lower the forward ends of the booms 15, 16. Preferably, the control valve 28 is connected to operate in conjunction with an "overload release and dump valve" (not shown) and a quadrant lever 29 as shown and described in the copending U. S. application of Chambers and McNeice, Serial No. 377,585, filed August 31, 1953, and now Patent No. 2,765,627, issued June 25, 1956. Reference to such application may be made for an understanding of the details of construction and operation of the control mechanism.

In accordance with the present invention, the tip scoop S comprises a receptacle here shown in the form of a bucket or shovel 30, formed as of relatively heavy gauge sheet steel to include a bottom portion 31 with a forward knife edge 32. The shovel is completed by an upstanding rear wall 34, curved to provide opposite sidewalls 35, tapering in height toward the leading knife edge 32. For pivotal mounting of the shovel 30 on the forward ends of the booms 15, 16 each rear corner of the shovel is provided with a welded bracket here formed by side-by-side plates 36 and 37 spread at their aft edges to present spaced ears apertured for removably receiving one of the lugs 19 and a suitable pivot pin 38 locked with a linch pin 39. Preferably, the upper rear portion of the innermost plate 36 has an ear 36a curved around to the rear wall 34 and welded for more rigid attachment. By the simple and sturdy arrangement described, the shovel 30 is thus adapted to pivot freely about a transverse axis along its rear wall 34 relative to the booms 15, 16. Under the gravitational force of its own weight, therefore, the shovel 30 normally swings to the depending position shown by dashed lines in Fig. 3 to discharge any material which has been previously picked up.

In keeping with one important aspect of the present invention, an extensible actuator is provided for rocking the shovel upwardly about the pivot pins 38 to the substantially horizontal position shown in Fig. 3 by solid lines. The extensible actuator is adapted not only to rock the shovel 30 to such position, but to maintain it in such position for scooping or transporting any of a wide range of materials without the necessity for latch or latch releasing mechanisms. In the present instance, the extensible actuator is provided in the form of a hydraulic ram or jack 40 pivotally connected between the lifting attachment L and the lower portion of the shovel's rear wall 34. As here shown, the hydraulic ram 40 is centrally located between the booms 15, 16 and includes a piston 41 telescoped into a cylinder 42, the former having at its end an apertured ear 44 pivotally received on a removable pin 45 inserted through spaced, apertured lugs 46 secured, as by welding, to the lower plate 22 of the lifting structure's interbracing arrangement. The cylinder 42 is fitted at its closed end with an axially adjustable shank 48 threaded into the cylinder and locked in a selected setting by means of a nut 49. The shank 48 includes at its extremity an apertured ear 50 which is pivotally received on a removable pin 51 inserted between spaced, apertured lugs 52 mounted, as by welding, on the lower central portion of the wall 34, and reinforced by gussets 54.

For limiting the downward swing of the shovel 30 to the substantially vertical position shown by dashed lines in Fig. 3, the outermost mounting plate 37 carries on its under edge an abutment block 55 which is positioned to engage the lug 19 on the corresponding one of the booms 15, 16. This assures that as the extensive force in the ram 40 is relaxed to release any load in the shovel 30 by letting the latter swing downwardly, the pivot connection at 51 does not swing above a line between the pivot connections at 45 and 38. Thus, when extensive force is reapplied by the ram 40 the shovel 30 again swings to the position shown by solid lines. In other words, the stop abutment 55 prevents the ram 40 from going "over center" and then exerting a force which tends to rock the shovel 30 still further in a clockwise direction as viewed in Fig. 3.

In order to energize the ram 40 with pressure fluid or bleed such fluid to extend and contract the ram and effect raising and holding of the shovel in its horizontal position, or for permitting it to drop to the vertical position, the cylinder 42 is connected into the hydraulic system of the tractor by a flexible conduit 56 extending through the hollow boom 16 to the control valve 28. While separate control valves for the lifting rams 24, 25 and the actuating ram 40 may be employed, the control valve 28 is preferably part of a control mechanism such as that described in the aforementioned copending application Serial No. 377,585 of Chambers and McNeice. By such arrangement the control valve, in conjunction with the quadrant lever 27, serves to selectively control both the rams 24, 25 and the ram 40. Thus, manipulation of the levers 29 and 28a permits the driver to supply additional fluid to the ram 40 to raise the shovel 30 to its horizontal position, to trap such fluid in the cylinder 42 for maintaining the shovel in such horizontal position, or for venting the fluid in the ram 40 and thus permitting the shovel to drop to its vertical position under the influence of its own weight and that of any load it is carrying.

In the use of the tip scoop, the hydraulic cylinder 42 is supplied with pressure fluid to extend and swing the shovel 30 to a substantially horizontal position. The maximum travel or extension of the hydraulic ram 40, together with the setting of the shank 48 limits such swing and determines the angle of the shovel bottom portion 31 in the loading and carrying position. The booms may then be lowered by draining fluid from the lift rams 24, 25 and the tractor driven forward to cause the scoop to bite into and pick up any of a wide range of granular materials, such as gravel, sand, dirt, grain, etc. The lift rams 24, 25 are then supplied with pressure fluid, by manipulating the control valve 28, to raise the booms to the position illustrated in Fig. 1. The tractor may next be driven to any desired delivery point, with fluid trapped in the hydraulic cylinder 40 maintaining the shovel 30 in its substantially horizontal, load carrying position. At the delivery point the load is dumped simply by setting the valve 28 to release the trapped fluid from the cylinder 42 whereupon the shovel swings under its own weight to the substantially vertical position.

Because the forward ends of the booms 15, 16 may be raised to a relatively great height above and in front of the tractor T, the load may be dumped into a truck bed or other elevated bin, if desired. When the load is dumped, the shovel 30 is prevented from swinging past its vertical position and thus running the ram 40 "over center" by the engagement of the stop abutments 55 with corresponding ones of the lugs 19. Therefore, when pressure fluid is again supplied to the ram 40 its extension will return the shovel 30 to the substantially horizontal position.

Merely by trapping fluid in the cylinder 42 of the ram 40, as described, provision is made for not only swinging the shovel to its scooping and load carrying position but for maintaining it in such position as loaded material is lifted and transported. Should the shovel 30 encounter an obstruction in its forward loading and scooping movement, or pick up a load too heavy for the shovel or the booms 15, 16 to properly handle, the pressure of the fluid in the ram 40 will tend to be increased. As a result, an overload release valve provided in the tractor's hydraulic system according to the above mentioned application Serial No. 377,585 may serve to vent the ram 40, permitting the shovel to yield to the "dump" position and preclude damage either to the tip scoop S or the lifting attachment L. In another advantageous aspect, the shank 48 threaded into the cylinder 42 permits of adjustment in the maximum length of the ram 40 when filled with pressure fluid. By loosening the lock nut 49, setting the shank 48, and retightening the lock nut, the angle of the scoop bottom 31 when in loading or carrying position may be adjusted. That is, the angle of attack of the shovel 30 in picking up of material as the tractor is driven forward may be adjusted to the most advantageous setting for the particular material being handled and its disposition on the ground or in a truck bed, receptacle, or bin.

And while the present invention is susceptible of practice by the construction of a tip scoop which is relatively simple in organization, it provides a marked improvement in both as to the initial cost and operating facility over prior tip scoops, especially in that the shovel 30 may be controlled from a valve located near the driver's seat on a tractor and may be held in loading or carrying position without the continued application of power or the use of a latch mechanism simply by trapping fluid in the hydraulic cylinder 42 as described.

We claim:

1. For use with a tractor having a hydraulic system and equipped with a forwardly extending lifting attachment adapted to be rocked vertically by hydraulic actuators energized from the hydraulic system, a tip scoop comprising, in combination, a scoop shovel having a bottom, a rear wall upstanding from the bottom, and upstanding side walls, means including a bracket secured near the lower rear corner on each of said side walls for connecting said shovel to the said lifting attachment for pivoting about a transverse axis, a hydraulic ram pivotally connected directly between said lifting attachment and the edge of said rear wall which is lowermost when the shovel bottom is substantially horizontal, means connecting said ram to the tractor's hydraulic system including a control valve for selectively supplying pressure fluid to extend said ram for rocking the shovel to a loading and carrying position, trapping fluid in said ram for maintaining the shovel in such position, or venting the ram to permit the shovel to swing to a dumping position.

2. The combination with a lifting structure of a tip scoop comprising a shovel having a bottom with a front scooping edge and a rear wall upstanding from the bottom, pivot means supporting the shovel from the lifting structure for swinging about a horizontal axis between positions in which the bottom of the shovel is substantially horizontally or vertically disposed, and an extensible hydraulic jack having a first end pivotally carried on the lifting structure and a second end pivotally connected directly to the rear wall of the shovel at a point below the axis of the pivot means supporting the shovel when the bottom of the latter is substantially horizontally disposed, said jack having a shank on one end which is adjustable in length to vary the position of the scoop when the jack is fully extended, and an abutment on said shovel adapted to engage the lifting structure to prevent the jack-shovel pivot connection from becoming coincident with a line running between the jack-lifting structure pivot and the shovel-lifting structure pivot, whereby an extensive force by said jack swings the shovel to a position with its bottom substantially horizontally disposed and the release of said extensive force gravitationally swings the scoop to a position with its bottom substantially vertically disposed.

3. The combination with a vertically movable lifting structure of a tip scoop comprising a shovel having a bottom wall and a rear wall upstanding from the bottom wall, means pivotally mounting the shovel at its rear wall on the lifting structure for swinging movement about a horizontal axis, an axially extensible hydraulic ram pivotally secured at one end to the lifting structure and at the other end directly to the rear wall of the shovel at a point vertically displaced from its horizontal pivot axis, and cooperating stop means on the shovel and the lifting structure for preventing the pivot between the scoop and the ram from becoming vertically coincident with a line extending between the respective pivots of the ram and shovel to the lifting structure as said ram is contracted.

References Cited in the file of this patent

UNITED STATES PATENTS

| 2,427,968 | Hoover | Sept. 23, 1947 |
| 2,441,070 | Hoover | May 4, 1948 |
| 2,488,699 | Anthony | Nov. 22, 1949 |
| 2,537,010 | Andersen | Jan. 9, 1951 |
| 2,679,327 | Hren | May 25, 1954 |

FOREIGN PATENTS

| 129,831 | Australia | Nov. 5, 1948 |